United States Patent [19]

Ogawa et al.

[11] Patent Number: 5,921,023
[45] Date of Patent: Jul. 13, 1999

[54] METHOD FOR PREVENTING AND TREATING DRY SPOTS

[75] Inventors: Kinya Ogawa, Tokyo; Kenichi Taguchi; Takumi Shirataki, both of Kubiki-mura, all of Japan

[73] Assignee: Shin-Etsu Company, Ltd., Tokyo, Japan

[21] Appl. No.: 08/907,945

[22] Filed: Aug. 11, 1997

[30] Foreign Application Priority Data

Aug. 23, 1996 [JP] Japan .................................... 8-241220

[51] Int. Cl.$^6$ .................................................... A01B 79/00
[52] U.S. Cl. ............................ 47/58.1; 504/351; 523/132
[58] Field of Search .............................. 47/58.1; 523/132; 504/351

[56] References Cited

U.S. PATENT DOCUMENTS 5,731,268  3/1998  Taguchi et al. ......................... 504/351

*Primary Examiner*—Leon B. Lankford, Jr.
*Attorney, Agent, or Firm*—Townsend & Banta

[57] ABSTRACT

A method of preventing and treating dry spots on the grass surface of a golf course comprising the sprinkling of a mixture of a nonionic surfactant and a water soluble polymer on the grass surface. The development of dry spots on the grass surface of a golf course can be prevented and also already developed dry spots can be treated and reduced by this method.

3 Claims, No Drawings

METHOD FOR PREVENTING AND TREATING DRY SPOTS

RELATED APPLICATIONS

This application claims the priority of Japanese Patent application No.8-241220 filed on Aug. 23, 1996, which is incorporeted herein by reference.

BACKGROUND OF THE INVENTION

1. Field of the Invention

This invention relates to a method of preventing dry spots from developing on the grass surface of a golf course and treating the already developed dry spots to maintain the golf course in a well managed condition.

2. The Prior Art

Recently, development of dry spots on the sand bent grass greens of golf courses has been a serious problem. A dry spot is an irregularly shaped area damaged by dryness due to an unknown cause. If the symptoms are advanced, the grass will eventually die.

The cause of dry spots can be consolidation of the soil, uneven water sprinkling, washing off of rain and sprinkled water and water repellency of the soil, of which water repellency of the soil is the most frequent cause. Once the water content of the soil is reduced and water repellency has developed, it becomes hard for sprinkled water to permeate and effective water sprinkling becomes difficult. Speculated causes of the water repellency include production of a water repellent substance by microorganisms, but a complete explanation has yet to be offered.

Methods which have been attempted to prevent dry spots include preventing the water content of the soil from decreasing, i.e. thorough water sprinkling management, sprinkling of a wetting agent to improve the wetting properties of the soil. However, there were the following problems: thorough sprinkling management required a significant workforce, securing enough water was difficult in some areas, and, as for sprinkling of a commercial wetting agent, there was a problem in the duration of the effect and an increase in the number of sprinklings lead to excessive foaming, requiring the use of a defoaming agent.

BRIEF SUMMARY OF THE INVENTION

The inventors conducted earnest research and discovered that sprinkling a mixture of a nonionic surfactant and a water soluble polymer on the grass surface could effectively prevent the development of dry spots using lesser amounts than the conventional wetting agents and could also improve already developed dry spots and thus completed the present invention.

The present invention provides a method of preventing and treating dry spots on the grass surface of a golf course comprising the sprinkling of a mixture of a nonionic surfactant and a water soluble polymer on the grass surface.

Also, the present invention provides the method of preventing and treating dry spots on the grass surface of a golf course as described above wherein said nonionic surfactant is one or more types chosen from among polyoxyethylene glycol, polyoxyethylene alkylphenol, polyoxyethylene-polyoxypropylene-polyoxyethylene glycol, polyoxyethylene-polyoxypropylene glycol ethylenediamine and polyoxyethylene monofattyacid ester.

Also, the present invention provides the method of preventing and treating dry spots on the grass surface of a golf course as described above wherein said water soluble polymer is a cationized water soluble polymer which is a water soluble polymer modified with cationization.

DETAILED DESCRIPTION

The present invention is described in detail below.

The present invention can prevent the development of dry spots on the grass surface of a golf course and can also treat and reduce already developed dry spots by sprinkling a mixture of a nonionic surfactant and a water soluble polymer on the grass surface. It is preferable to sprinkle the mixture of a nonionic surfactant and a water soluble polymer as an aqueous solution.

In particular, when a cationized water soluble polymer is used as the water soluble polymer, the development of dry spots can be prevented for a long period of time.

Also, the effect of preventing dry spots from developing and treating already developed dry spots was improved when a mixture of a nonionic surfactant and a water soluble polymer was sprinkled rather than sprinkling them separately. Although the reason for this is not clear, it is believed that mixing the nonionic surfactant and the water soluble polymer improves penetration and adsorption of the water soluble polymer into the soil.

For the nonionic surfactant used in the present invention, a polyoxyethylene type such as polyoxyethylene glycol, polyoxyethylene alkylphenol, polyoxyethylene-polyoxypropylene-polyoxyethylene glycol, polyoxyethylene-polyoxypropylene glycol ethylenediamine and polyoxyethylene monofattyacid ester are preferable. Two or more types of nonionic surfactants can be mixed for use as well.

For the water soluble polymer used jointly with the nonionic surfactant, for example, cellulose derivatives including methyl cellulose, hydroxylethyl cellulose, hydroxypropylmethyl cellulose, hydroxyethylmethyl cellulose and carboxymethyl cellulose, natural gums including guar gum, xanthan gum and gum arabic, polyvinyl alcohols or their cationized products, and prior art water soluble polymers including polyacryl amide, arginic soda, polyethylene glycol and polypropylene glycol can be used without particular limitation. In order to prevent dry spots for a long duration of time, it is preferable to use a cationized water soluble polymer which is a water soluble polymer modified with cationization.

In the present invention, it is preferable to prepare a 0.01–0.5 wt % aqueous solution of said nonionic surfactant and sprinkle this aqueous solution on the grass surface. The preferable amount should be enough for the treatment solution to permeate into the soil, i.e. 0.5–5.0 liter/$m^2$.

If the concentration of the aqueous solution of the nonionic surfactant is less than 0.01 wt %, then the water may not permeate enough. If it is more than 0.5 wt %, then the effect is not improved and phytotoxity may result depending on the type of the grass.

The water soluble polymer which is to be mixed with the nonionic surfactant is preferably dissolved in an aqueous solution such that the concentration is 0.001–2.0 wt %. If the concentration is less than this range then the water retention is not sufficient. It is not preferable to use a concentration above this range because the prevention effect does not change and the viscosity of the aqueous solution increases.

The reasons why the present invention can prevent or treat dry spots are believed to be as follows: when said mixture solution is sprinkled on water repellent soil, the nonionic surfactant eases the high surface tension of water and accelerates permeation of water into the water repellent soil and then the water soluble polymer increases the water retention of the soil permeated with water and thus the water content of the soil increases. The latter is believed to be the reason why the development of dry spots is prevented for a long duration of time. In addition, since the polymer infiltrates and is adsorbed by the soil, solidification and an increase in water repellency of the soil can be prevented.

The present invention can prevent the development of dry spots on the grass surface of a golf course and can also treat and reduce already developed dry spots by sprinkling a mixture of a nonionic surfactant and a water soluble polymer on the grass surface.

The present invention is described in detail below by referring to examples. The present invention is not limited to the following examples. The concentrations of aqueous solutions are all in weight percent units.

EXAMPLES

[Example 1]

In a bent grass nursery of a golf course in Toyama prefecture, the amount of water sprinkling was adjusted, starting from the last ten days of July, to create a test area (A) with a high water content and test areas (B and C) with a low water content. These test areas were divided into 2 meter square lots. On each lot, an aqueous solution of one of the treatment agents (No. 1–6) described below was sprayed with a sprinkling can such that the amount would be 1 liter/m². After this, a 5 mm per unit area of water sprinkling was conducted every 7 days and the development of dry spots on the grass surface was observed. The number of days passed before dry spots developed after spraying of the aqueous solution of each treatment agent is shown in Table 1.

[No. 1: Present Invention]

An aqueous solution containing 0.1% polyoxyethylene-polyoxypropylene-polyoxyethylene glycol (Nissan Pronon 201 from Nippon Oil and Fats Co., Ltd.) and 0.1% cationized hydroxyethyl cellulose (Catinal HC-200 from Toho Chemical Industry Co., Ltd.) was sprinkled.

[No. 2: Present Invention]

An aqueous solution containing 0.1% polyoxyethylene-polyoxypropylene-polyoxyethylene glycol (Nissan Pronon 201 from Nippon Oil and Fats Co., Ltd.) and 0.1% hydroxypropylmethyl cellulose (Metolose 90SH-4000 from Shin-Etsu Chemical Co., Ltd.) was sprinkled.

[No. 3: Comparative Example]

An aqueous solution of 0.1% polyoxyethylene-polyoxypropylene-polyoxyethylene glycol (Nissan Pronon 201 from Nippon Oil and Fats Co., Ltd.) was sprinkled.

[No. 4: Comparative Example]

An aqueous solution of 0.1% cationized hydroxyethyl cellulose (Catinal HC-200 from Toho Chemical Industry Co. , Ltd. ) was sprinkled.

[No. 5: Comparative Example]

The aqueous solution of No. 4 was sprinkled and, after two days, the aqueous solution of No. 3 was sprinkled.

[No. 6: Comparative Example]

Water was sprinkled.

Table 1 shows the number of days after the aqueous solution of each treatment agent was sprinkled until dry spots developed.

TABLE 1

| | Number of days before dry spots developed on the grass surface | | |
|---|---|---|---|
| Test Area | A | B | C |
| Initial water content of the soil (depth 3 cm) | 9.5% | 4.0% | 4.0% |
| Sample No. 1 | No development after 40 days | No development after 40 days | No development after 40 days |
| Sample No. 2 | 35 days | 35 days | 28 days |
| Sample No. 3 | 27 days | 14 days | 17 days |
| Sample No. 4 | 20 days | 10 days | 9 days |
| Sample No. 5 | 28 days | 14 days | 18 days |
| Sample No. 6 | 18 days | 7 days | 8 days |

(Test area C received 50 mm per unit area of water sprinkling, as rain simulation, a week after the spraying of the treatment agent.)

As shown above, the method of the present invention which sprinkles an aqueous solution of a nonionic surfactant and a water soluble polymer (No. 1 and No. 2) can prevent the development of dry spots for a long duration of time regardless of the water content of the soil or rain conditions. It is also shown that the method of the present invention can prevent the development of dry spots for a longer duration compared with sprinkling either the nonionic surfactant or the water soluble polymer individually (No. 3 and No. 4). It is also shown that the method of the present invention which uses the water soluble polymer which is not cationized also prevents the development of dry spots for a long duration of time, but rain causes draining of the treatment agent and reduces the preventive effect (No. 2 and No. 3). It is also shown that the effect of preventing the development of dry spots is reduced when the nonionic surfactant and the water soluble polymer are sprinkled separately compared with when a mixture of the two is sprinkled (No. 5).

[Example 2]

In a bent grass nursery in the same golf course as in Example 1, a bent grass nursery was divided into 2 meter square lots in the first ten days of August and a sprinkling can was used to sprinkle an aqueous solution of the treatment agent used in Example 1 on each lot such that the amount would be 1 liter/ m². After this, typical water sprinkling management was carried out for a month and the condition of the grass surface was observed. Changes in the dry spot areas after the sprinkling of each treatment agent are shown in Table 2.

TABLE 2

| | Ratio of the dry spot areas and the total grass surface (%) | | |
|---|---|---|---|
| | Before the sprinkling of the treatment agent | One week after the sprinkling of the treatment agent | One month after the sprinkling of the treatment agent |
| Sample No. 1 | 21% | 0% | 0% |
| Sample No. 2 | 18% | 0% | 0% |
| Sample No. 3 | 19% | 5% | 18% |
| Sample No. 4 | 20% | 17% | 19% |
| Sample No. 5 | 19% | 17% | 18% |
| Sample No. 6 | 18% | 40% | 55% |

The above results show that the method of the present invention which sprinkles an aqueous solution of a nonionic surfactant and a water soluble polymer has a greater effect of treating dry spots than when either the nonionic surfactant or the water soluble polymer is sprinkled individually and prevents the development of dry spots for a long time after the treatment.

What is claimed is:

1. A method of preventing and treating dry spots on the grass surface of a golf course comprising the sprinkling of a mixture of a nonionic surfactant and a water soluble polymer on said grass surface, wherein said nonionic surfactant is one or more nonionic surfactants selected from the group consisting of polyoxyethylene glycol, polyoxyethylene alkylphenol, polyoxyethylene-polyoxypropylene-polyoxyethylene glycol, polyoxyethylene-polyoxypropylene glycol ethylenediamine and polyoxyethylene monofattyacid ester, and said water soluble polymer is a water soluble polymer modified with cationization.

2. The method of claim 1, wherein said mixture comprises 0.01 to 0.05 wt % nonionic surfactant.

3. The method of claim 1, wherein said mixture comprises 0.001 to 2.0 wt % water soluble polymer.

* * * * *